(12) United States Patent
Uzun

(10) Patent No.: US 6,590,898 B1
(45) Date of Patent: Jul. 8, 2003

(54) METHOD AND APPARATUS FOR ROUTING DATA PACKETS

(75) Inventor: Necdet Uzun, Holmdel, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 09/474,993

(22) Filed: Dec. 30, 1999

(51) Int. Cl.$^7$ .............................................. H04L 12/28
(52) U.S. Cl. ...................... 370/401; 370/408; 370/475; 709/242
(58) Field of Search ................................ 370/401, 408, 370/392, 389, 400, 351, 475; 709/238–244; 707/3

(56) References Cited

U.S. PATENT DOCUMENTS

| | | | |
|---|---|---|---|
| 6,061,712 A | * | 5/2000 | Tzeng ........................ 709/202 |
| 6,212,184 B1 | * | 4/2001 | Venkatachary et al. ..... 370/392 |
| 6,266,706 B1 | * | 7/2001 | Brodnik et al. ............. 709/242 |
| 6,493,706 B1 | * | 12/2002 | Mead et al. ................... 707/3 |

* cited by examiner

Primary Examiner—Ricky Ngo
Assistant Examiner—Yvonne Q. Ha
(74) Attorney, Agent, or Firm—Klauber & Jackson

(57) ABSTRACT

A method for routing a data packet is disclosed. A first preferred embodiment of the present invention uses a trie data structure to store information such as the output port address associated with a plurality of the most significant bits ("prefixes") of the destination address field of a data packet presented to a router. The first preferred embodiment stores information associated with both (1) prefixes that are integral multiples of the binary logarithm of the number of words in each node of the trie data structure and (2) prefixes that are not integral multiples. In the event that an output port address is deleted with respect to a prefix that is an integral multiple, the output port address associated with a shorter prefix that is not an integral multiple is preserved. Methods of retrieval, insertion and deletion of information are disclosed. Other aspects of the invention pertain to certain systems and articles of manufacture comprising computer programs.

8 Claims, 7 Drawing Sheets

---

Calculate X= the dimension of the terminal node less the length of the terminal substring Concatenate the terminal substring with X '00...0'S Count in increments of '1' until the concatenated binary digits are all '1's

FIG. 1
PRIOR ART $S_0$

|  | S | V | R | CC | FP |
|---|---|---|---|---|---|
| 0000 | 1 | 0 |  | CC=2 |  |
| 0001 | 1 | 0 |  |  |  |
| 0010 | 1 | 0 |  |  |  |
| 0011 | 0 | 1 | c |  | S1 |
| 0100 | 1 | 0 |  |  |  |
| 0101 | 1 | 0 |  |  |  |
| 0110 | 0 | 0 |  |  | S4 |
| 0111 | 1 | 0 |  |  |  |
| 1000 | 1 | 0 |  |  |  |
| 1001 | 1 | 0 |  |  |  |
| 1010 | 1 | 0 |  |  |  |
| 1011 | 1 | 0 |  |  |  |
| 1100 | 1 | 0 |  |  |  |
| 1101 | 1 | 0 |  |  |  |
| 1110 | 1 | 0 |  |  |  |
| 1111 | 1 | 0 |  |  |  |

$S_1$

|  | S | V | R | CC | FP |
|---|---|---|---|---|---|
| 0000 | 1 | 1 | i | CC=7 |  |
| 0001 | 1 | 0 |  |  |  |
| 0010 | 1 | 0 |  |  |  |
| 0011 | 1 | 0 |  |  |  |
| 0100 | 1 | 1 | j |  |  |
| 0101 | 1 | 1 | k |  |  |
| 0110 | 1 | 0 |  |  |  |
| 0111 | 1 | 0 |  |  |  |
| 1000 | 0 | 0 | t |  | S2 |
| 1001 | 1 | 1 | l |  |  |
| 1010 | 1 | 0 |  |  |  |
| 1011 | 1 | 0 |  |  |  |
| 1100 | 1 | 0 |  |  |  |
| 1101 | 1 | 1 | m |  |  |
| 1110 | 1 | 0 |  |  |  |
| 1111 | 1 | 0 | n |  |  |

$S_2$

|  | S | V | R | CC | FP |
|---|---|---|---|---|---|
| 0000 | 1 | 1 | p | CC=16 |  |
| 0001 | 1 | 0 |  |  |  |
| 0010 | 1 | 1 | p |  |  |
| 0011 | 1 | 1 | p |  |  |
| 0100 | 1 | 1 | p |  |  |
| 0101 | 1 | 1 | p |  |  |
| 0110 | 1 | 1 | p |  |  |
| 0111 | 1 | 1 | p |  |  |
| 1000 | 1 | 1 | m |  |  |
| 1001 | 1 | 1 | m |  |  |
| 1010 | 1 | 1 | m |  |  |
| 1011 | 1 | 1 | m |  |  |
| 1100 | 1 | 1 | m |  |  |
| 1101 | 1 | 1 | m |  |  |
| 1110 | 1 | 1 | q |  |  |
| 1111 | 1 | 1 | o |  |  |

| | S | V | F | R | SR | | VSP | FP |
|---|---|---|---|---|---|---|---|---|
| 0000 | 1 | 0 | 0 | | CC=2 | | 000 | |
| 0001 | 1 | 0 | 0 | | NA | 000 | 000 | |
| 0010 | 1 | 0 | 0 | | NA | 00 | 000 | |
| 0011 | 1 | 1 | 1 | c | NA | 001 | 000 | $S_1$ |
| 0100 | 1 | 0 | 0 | | NA | 0 | 000 | |
| 0101 | 1 | 0 | 0 | | NA | 010 | 000 | |
| 0110 | 0 | 0 | 0 | | NA | 01 | 000 | $S_4$ |
| 0111 | 1 | 0 | 0 | | NA | 011 | 000 | |
| 1000 | 1 | 0 | 0 | | X | | 000 | |
| 1001 | 1 | 0 | 0 | | NA | 100 | 000 | |
| 1010 | 1 | 0 | 0 | | NA | 10 | 000 | |
| 1011 | 1 | 0 | 0 | | NA | 101 | 000 | |
| 1100 | 1 | 0 | 0 | | NA | 1 | 000 | |
| 1101 | 1 | 0 | 0 | | NA | 110 | 000 | |
| 1110 | 1 | 0 | 0 | | NA | 11 | 000 | |
| 1111 | 1 | 0 | 0 | | NA | 111 | 000 | |

$S_1$

| | S | V | F | R | SR | | VSP | FP |
|---|---|---|---|---|---|---|---|---|
| 0000 | 1 | 1 | 1 | i | CC=7 | | 000 | |
| 0001 | 1 | 0 | 0 | | NA | 000 | 000 | |
| 0010 | 1 | 0 | 0 | | NA | 00 | 000 | |
| 0011 | 1 | 0 | 0 | | NA | 001 | 000 | |
| 0100 | 1 | 0 | 1 | j | NA | 0 | 001 | |
| 0101 | 1 | 1 | 0 | k | k | 010 | 001 | |
| 0110 | 1 | 0 | 0 | | NA | 01 | 000 | |
| 0111 | 1 | 0 | 0 | | NA | 011 | 000 | |
| 1000 | 0 | 1 | 0 | t | X | | 000 | $S_2$ |
| 1001 | 1 | 1 | 1 | l | NA | 100 | 000 | |
| 1010 | 1 | 0 | 0 | | NA | 10 | 000 | |
| 1011 | 1 | 0 | 0 | | NA | 101 | 000 | |
| 1100 | 1 | 0 | 0 | | NA | 1 | 000 | |
| 1101 | 1 | 1 | 1 | m | NA | 110 | 000 | |
| 1110 | 1 | 0 | 0 | | NA | 11 | 000 | |
| 1111 | 1 | 0 | 0 | n | NA | 111 | 000 | |

$S_2$

| | S | V | F | R | SR | | VSP | FP |
|---|---|---|---|---|---|---|---|---|
| 0000 | 1 | 1 | 0 | p | CC=16 | | 100 | |
| 0001 | 1 | 0 | 0 | | NA | 000 | 100 | |
| 0010 | 1 | 1 | 0 | p | NA | 00 | 100 | |
| 0011 | 1 | 1 | 0 | p | NA | 001 | 100 | |
| 0100 | 1 | 1 | 0 | p | p | 0 | 100 | |
| 0101 | 1 | 1 | 0 | p | NA | 010 | 100 | |
| 0110 | 1 | 1 | 0 | p | NA | 01 | 100 | |
| 0111 | 1 | 1 | 0 | p | NA | 011 | 100 | |
| 1000 | 1 | 1 | 0 | m | X | | 100 | |
| 1001 | 1 | 1 | 0 | m | NA | 100 | 100 | |
| 1010 | 1 | 1 | 0 | m | NA | 10 | 100 | |
| 1011 | 1 | 1 | 0 | m | NA | 101 | 100 | |
| 1100 | 1 | 1 | 0 | m | m | 1 | 100 | |
| 1101 | 1 | 1 | 0 | m | NA | 110 | 100 | |
| 1110 | 1 | 1 | 1 | q | NA | 11 | 101 | |
| 1111 | 1 | 1 | 0 | o | o | 111 | 101 | |

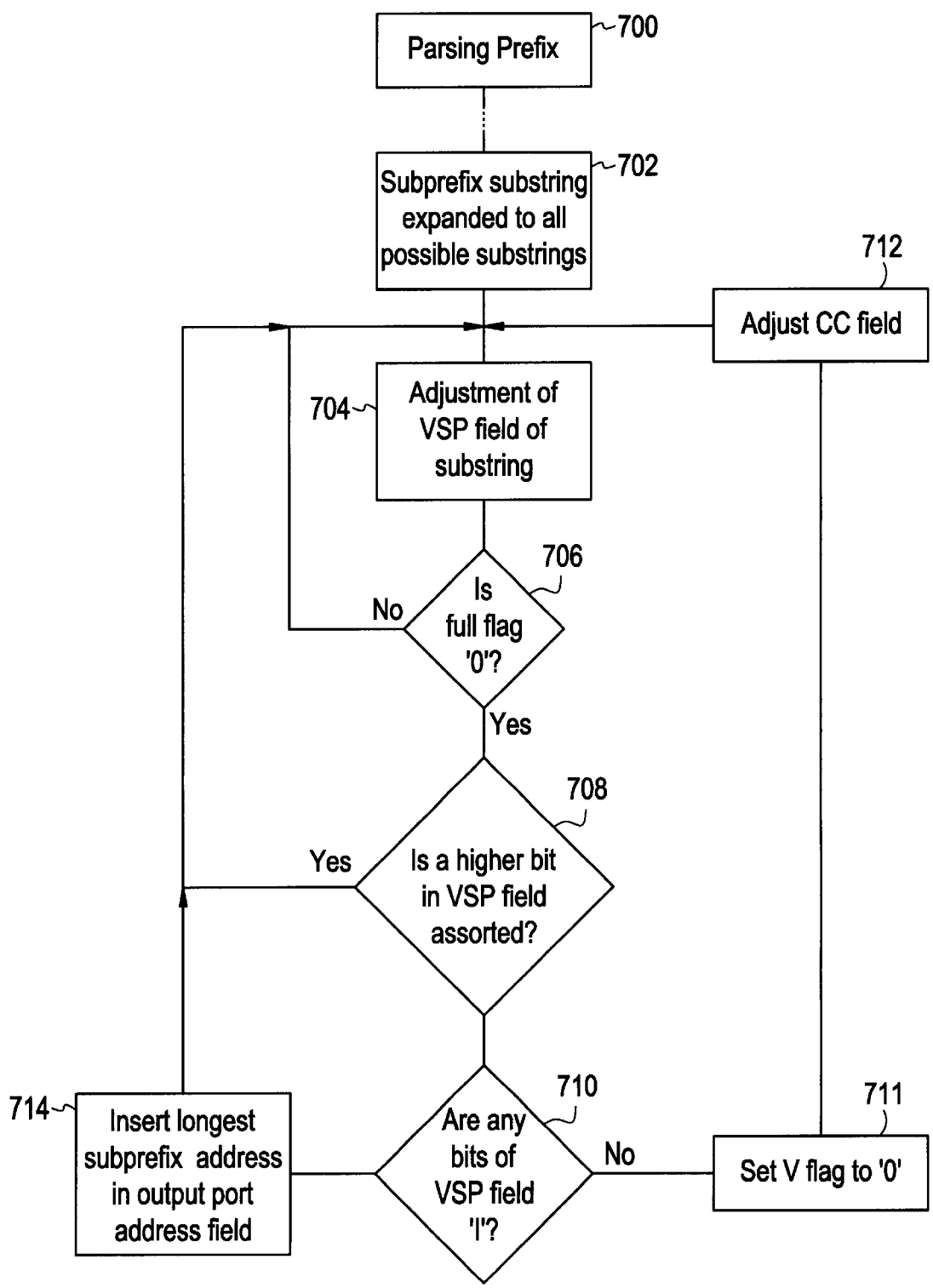

METHOD AND APPARATUS FOR ROUTING DATA PACKETS

FIELD OF INVENTION

The present invention relates generally to the field of transmitting data packets on a wide-area data communication network such as the Internet. More particularly, the present invention relates to routing data packets by using the destination address field of a data packet to retrieve an output port address from a trie data structure.

BACKGROUND OF THE INVENTION

In the data communication network known as the Internet, a device known as a router routes data packets. The router may be connected to (1) a local area network composed of host computers and/or (2) a plurality of other routers. Each data packet originates at a specific computer and may include voice, music, full-motion video or data information. The data packet is then transmitted from one router to another by action of the circuitry of the routers. Eventually, the data packet is transmitted to a router that is directly connected to the computer that is the intended recipient of the data packet.

A central problem in designing a router is maximizing the efficiency of the router in determining the proper output port address for the router to use in transmitting the presented data packet. This process should occur using a minimum of clock cycles, otherwise the presented data packet would have to be stored while awaiting processing. (This storage or buffering would increase the hardware cost of the router.)

In the simplest form of routing, the circuitry of the router would have the capability to determine the appropriate output port address for every possible destination address field of a presented data packet. Although such an approach was viable in the early days of the Internet, it is no longer a useful option given the present size of the Internet. As an alternative, several different techniques have been used such as binary trees, b-trees and hash tables. Most of these techniques do not attempt to associate an output port address with the entire destination address field but with one or more of the most significant bits of the destination address. (The binary number represented by one or more of the most significant bits of the destination address field is commonly referred to in the prior art as a prefix.) More specifically, these techniques use the longest prefix for which there is an associated output port address as the basis for selecting the output port address for transmitting the presented data packet.

As an example of the functioning of one of these techniques, assume that a data packet contains a destination address field that includes the four bit number '1011' as its most significant bits. Four of the possible prefixes of the destination address field of this data packet are '1', '10', '101' or '1011'. Further assume that the circuitry of the router has access to a database that contains each output port address associated with each of these prefixes. Although there are several output port addresses associated with this single destination address field, the circuitry of the router transmits the presented data packet in accordance with the output port address that is associated with the prefix that is the longest of the various prefixes. Accordingly, the presented data packet would be transmitted to the router associated with the output port address that is associated with the prefix '1011'. If the data base did not contain an output port address associated with the prefix '1011', then the output port address associated with '101' would be used. If the data base did not contain an output port address associated with the prefix '101', then the process continues in similar fashion using the shorter prefixes. If there were no output port addresses associated with any prefix of the destination address field of the presented data packet, then the router may use a default output port address.

The reason that the longest prefix is selected is because the longest prefix contains the most information about the ultimate destination of the data packet, and accordingly the output port address associated with the longest prefix is the best choice in light of the information available.

The goal then in designing algorithms in the field to which the present invention pertains is to develop an algorithm that most efficiently (1) determines the longest prefix from the destination address field for which there is an associated output port address and (2) retrieves that associated port address for use by the circuitry of the router in transmitting the presented data packet.

One common algorithm in the prior art that is designed to satisfy the two above goals uses the data structure commonly known as a "trie" data structure. The trie data structure is a type of tree data structure. The trie data structure has a root node, intermediate level nodes and external leaf nodes. Each node consists a predetermined plurality of words. Each word is composed of a predetermined plurality of bits. The plurality of bits in each word is divided into fields.

In one embodiment in the prior art, each word contains the following fields:

The stop flag field, which indicates to the circuitry of the router if retrieval stops at the node that holds the word or should continue to a higher level node whose address is contained in the forward pointer field, which is discussed below.

The valid flag field, which indicates to the circuitry of the router whether the output port address contained in this word is valid.

The output port address field, which contains, if appropriate, the output port address of the next router to which the presented data packet would be transmitted, in appropriate circumstances by the action of the circuitry of the router.

The children counter field, which indicates to the circuitry of the router the number of words in the node that contain useful information. In this context, useful information is either a word with a valid output port address (that is, the valid flag field is set to '1') or a word with a valid forward pointer field. In the latter case, the stop flag field would be set to '0'. The children counter field is contained only in the first word of the relevant node.

The forward pointer field, which contains, if appropriate, the address of the next node of the trie data structure in the memory of the circuitry of the router if the stop bit is not '1'.

This trie data structure supports the actions of the circuitry of a router in (1) retrieving an output port address from the trie data structure, (2) inserting an output port address into the trie data structure and (3) deleting an output port address from the trie data structure.

In accordance with a common technology in the prior art, the destination address field of the presented data packet is parsed by the action of the circuitry of the router into several smaller binary numbers of an equal predetermined length. (For purposes of this specification and claims, each of the smaller binary numbers is referred to as a substring.) For example, if the predetermined length was 4 bits, then a 32 bit destination address would be broken into 8 substrings each of 4 bits.

The number of words in each node is equal to 2 raised to the predetermined number of bits in each substring, and each substring is an address to a word in the appropriate node (This number is referred to in this specification and claims as the "dimension" of the node.) The circuitry of the router first processes the word in the root node whose address is the initial substring. If the valid flag field of that word is '1', then the binary number stored in the output port address field of that word is stored in an internal register, so that at any point the last valid output port address is available to the circuitry of the router. If the stop flag field of that word is also '1', then the output port address used in transmitting the presented data packet is the output port address stored in the output port address field of that word. If the stop flag field is '0', then a word of the next higher-level node is processed by the circuitry of the router. The address of that node is stored in the forward pointer field of that word. The circuitry of the router then processes the words whose address is the next higher-level node is the second substring.

In summary, the process continues until a word is processed whose stop flag field is '1'. (For purposes of this specification and claims, the node that contains this word is referred to as the terminal node.) At this point, retrieval ceases. If the valid flag field is '1', the circuitry of the router transmits the data packet to the router associated with the output port address field stored in the output port address field of the relevant word of the terminal node. If the valid flag field is '0', the last valid output port address, stored in an internal register, will be used.

It is important to note that each prefix of the destination address field of a presented data packet maps to a single output port address; the reverse, however, is not the case: one output port address may be mapped to by many prefixes.

By way of an example, FIG. 1 shows a representation of a simple trie data structure. The trie data structure of FIG. 1 has three levels. The first level consist of root node $S_0$. The second level is an intermediate level that consists of node $S_1$. The third level consists of leaf node $S_2$.

Assume that a data packet with a destination address whose most significant bits are '001110000000' is presented to a router using the trie data structure of FIG. 1. The circuitry of the router will first parse these bits into three 4-bit substrings: '0011', '1000' and '0000'. The circuitry of the router first processes the word in the root node $S_0$ whose address is '0011'. Since the valid flag field of this word is '1', the output port address—"e"—is stored in an internal register. (For purposes of this specification "a", "b" and similar single character strings enclosed in double quotes represent a specific output port address.) Since the stop bit field of the word being processed in node $S_0$ is '0', the circuitry of the router then proceeds to process the next node, $S_1$ of the trie data structure. The circuitry of the router processes the word in node $S_1$ whose address is '1000'. The circuitry of the router does not store output port address that is contained in the output port address field of this word in an internal register because the valid field flag of this word is '0'. Since the stop play field of this word is '0', the circuitry of the router next processes the word in node $S_2$ whose address is '0000'. Since the stop flag field is of this word is '1' and valid flag field is '1', the circuitry of the router transmits the data packet presented to the router to the router whose output port address is "p."

As another example, assume that a data packet with a destination address field whose most significant bits are '001110000001' is presented to the router. The retrieval will be identical to the one described in the previous paragraph except for the last substring. Instead of the circuitry of the router processing the word in node $S_2$ at address '0000', the circuitry of the router processes the word at the address '0001'. Since the stop flag field of this word is '1' the retrieval stops. Since the valid flag is "0", the data packet is transmitted to the router associated with output port address "e", which was the last valid output port address stored in an internal register.

Insertion of an additional prefixes in the trie data structure has two cases. In the first case, no new nodes are inserted in the trie data structure. In the second case, a new node must be added to the trie data structure. Referring again to FIG. 1, if output port address "b" associated with the prefix '0101' is to be inserted, then the circuitry of the router alters the valid flag field of the word with address '0101' to '0' and inserts "b" in the output port address field of this word. The circuitry of the router then increments the children counter field of node $S_0$ at address '0000' from 2 to 3. The circuitry of the router does not alter the stop flag field because it is already '1'.

If prefix '1001010000100000' associated with output port address "d" is inserted in the trie data structure represented in FIG. 1, then the sequence of steps will be more involved since a new node must be inserted in the trie data structure. The circuitry of the router first processes the word located at address '1001' in node $S_0$. The stop flag field of this word is altered from '1' to '0'. As a consequence the children counter field of the root node $S_0$, changes from '2' to '3'. Similar actions take place with respect to node $S_1$ and $S_2$. The circuitry of the router then appends node $S_3$ to the trie data structure. The children counter field of node $S_3$ is incremented from 0 to 1. The circuitry of the router causes the value of valid flag field of the word at address '0000' in node $S_3$ to change to '1' and causes "d" to be inserted in routing address field of the relevant word. No change is necessary to the stop flag field because for purposes of these examples, it is assumed that in all newly inserted nodes, all stop flag fields are initially set at '1' and all valid field flags are set at '0'.

The trie data structure also lends itself well to efficient deletion of a prefix. If a prefix is deleted from the search trie, the node containing this prefix may or may not be removed. For example, removing routing address "a" associated with prefix '00110100' will be accomplished by making valid flag field of node $S_1$ at address '0100' equal to '0' and decrementing children counter field of node $S_1$ to 1. The node $S_1$ is not deleted because it contains other valid entries.

In order for the action of the circuitry of the router to perform deletion correctly, a deletion stack will need to be utilized. Basically all the addresses, which the search will traverse will be pushed on this stack. After the search, the address will be popped up one by one, and the nodes containing them will be processed. Deletion stops when the circuitry of the router encounters a first node with a children counter field that holds a value greater than zero.

A serious drawback of the prior art is its inability to efficiently handle prefixes that are not an integral multiple of the number of words in each node of the trie data structure. (For purposes of this specification and claims a prefix of this nature is referred to as a "subprefix".) For example, if the dimension of each node is four, the prior art does not provide an obvious method for insertion or deletion of a prefix not an integral multiple of four. One approach has been to expand the subprefix and convert it into a prefix by concatenating the subprefix with the appropriate number of bits as illustrated in FIG. 3. For example, if subprefix '1011010' was to be inserted into the trie data structure, then the output port address would have to be associated with the prefixes '10110100' and '10110101' in order that the output port address is properly inserted in the trie data structure. The insertion, in itself, does not present a problem. Assume however, that output port address associated with the prefix '10110100' is inserted in the trie data structure. In that case, the output port address associated with subprefix '1011010' would be overridden (as appropriate), but if the output port address associated with '10110100' was then later deleted, the output port address information associated with the subprefix '1011010' is partially lost.

This loss of information occurs as a general matter whenever a prefix is inserted in the trie data, over writing a subprefix, and the prefix is then later deleted from the trie data structure.

SUMMARY OF THE INVENTION

One aspect of the invention is a trie data structure stored on a computer readable medium that is used for storing a first binary number associated with a second binary number, the trie data structure consisting of nodes, the nodes including a root node, the root node being a first node, at least one intermediate level node, the intermediate level node being directly linked to the root node and having other lower level nodes directly linked to the intermediate level node, and at least one leaf node that is directly linked to a higher level node and having no lower level nodes directly linked to that leaf node, each of the nodes being an associative table of binary numbers consisting of rows and columns with each number of the rows of each of these nodes being the same number, wherein, if the length of the second binary number is not an integral multiple of the number of rows, the first binary number is stored at a position defined by the intersection of a row and a column in one of the nodes, wherein that one node is determined by the second binary number and the row and column of the one node is determined by the second binary number.

Another aspect of the invention is a method for use in retrieving a first binary number associated with a second binary number in a trie data structure stored on a computer readable storage medium, the trie data structure consisting of nodes, the nodes including a root node, the root node being a first node, at least one intermediate level node, the intermediate level node being directly linked to the root node and having other lower level nodes directly linked to the intermediate level node, and at least one leaf node, the leaf node being directly linked to a higher level node and having no lower level nodes directly linked to the leaf node, each of the nodes being an associative table of binary numbers consisting of rows and columns with each number of the rows of each of the nodes being the same number, wherein, when the length of the second binary number is not an integral multiple of the number of rows, the first binary number is stored at a position defined by the intersection of at least one of the rows and at least one of the columns in at least one of the nodes, the method including the steps of:

i. parsing the second binary number into substrings, wherein each of the substrings has a number of binary digits equal to the dimension of each of the nodes except for the last substring whose number of binary digits is less than the dimension of each of the nodes;

ii. using the substrings to map a path from the root node to a terminal node holding the first binary number; and iii. retrieving the first binary number from the terminal node.

Another aspect of the invention is a method for use in inserting a first binary number associated with a second binary number in a trie data structure stored on a computer readable storage medium, the trie data structure consisting of nodes, the nodes including a root node, the root node being a first node, at least one intermediate level node, the intermediate level node being directly linked to the root node and having other lower level nodes directly linked to the intermediate level node, and at least one leaf node, the leaf node being directly linked to a higher level node and having no lower level nodes directly linked to the leaf node, each of the nodes being an associative table of binary numbers consisting of rows and columns with each number of the rows of each of the nodes being the same number, wherein, when the length of the second binary number is not an integral multiple of the number of rows, the first binary number is stored at a position defined by the intersection of at least one of the rows and at least one of the columns in a terminal node, the method including the steps of:

i. parsing the second binary number into substrings, wherein each of the substrings has a number of binary digits equal to the dimension of each of the nodes except for the last substring whose number of binary digits is less than the dimension of each of the nodes;

ii. using the substrings to map a path from the root node to the terminal node associated with the first binary number; and iii. storing the first binary number from the terminal node.

Another aspect of the invention is a method for use in deleting a first binary number associated with a second binary number in a trie data structure stored on a computer readable storage medium, the trie data structure consisting of nodes, the nodes including a root node, the root node being a first node, at least one intermediate level node, the intermediate level node being directly linked to the root node and having other lower level nodes directly linked to the intermediate level node, and at least one leaf node, the leaf node being directly linked to a higher level node and having no lower level nodes directly linked to the leaf node, each of the nodes being an associative table of binary numbers consisting of rows and columns with each number of the rows of each of the nodes being the same number, wherein, if the length of the second binary number is not an integral multiple of the number of rows, the first binary number is stored at a position defined by the intersection of a row and a column in a terminal node, the method including the steps of:

i. parsing the second binary number into substrings, wherein each of the substrings has a number of binary digits equal to the dimension of each of the nodes except for the last substring whose number of binary digits is less than the dimension of each of the nodes;

ii. using the substrings to map a path from the root node to the terminal node associated with the first binary number; and iii. deleting the first binary number from the terminal node.

Another aspect of the invention is in a trie data structure stored on a computer readable storage medium that is used for transmitting a presented data packet, the trie data structure including a root node, one or more intermediate level nodes, and one or more leaf nodes, wherein each node is composed of a number of words, each of the words having fields composed of a plurality of bits that is processed by the circuitry of a router and causes the router to transmit the presented data packet in accordance with an output port address associated with the word, a field composed of a plurality of bits that is examined by the circuitry and indicates to the circuitry if a valid output port address is contained in the word, a field composed of a plurality of bits that is capable of containing an output port address, a field composed of a plurality of bits that is capable of containing the address in the computer readable storage medium of another node of the trie data structure, a field composed of a plurality of bits that is capable of containing information indicating either the number of words in the node that contain useful information, wherein the improvement includes:

i. a first field composed of a plurality of binary digits that is capable of containing information indicating either the number of words in the node that contain useful information or additional routing information associated with a subprefix;
  ii. a second field composed of a plurality of binary digits is capable of indicating that an output port address is associated with a full prefix; and
  iii. a third field composed of a plurality of binary digits that is capable of containing information indicating the location of valid output port addresses in the first field.

BRIEF DESCRIPTION OF THE DRAWINGS

The present invention is made more readily understandable by reference to the accompanying drawings in which:

FIG. 1 is a representation of a prior art trie data structure.

FIG. 2 is a representation of a trie data structure that is a preferred embodiment of the present invention.

FIG. 7 is a flow chart illustrating deletion of prefixes from the trie data structure in accordance with a preferred embodiment of the present invention.

DETAILED DESCRIPTION OF A PREFERRED EMBODIMENT OF THE INVENTION

Reference is made to the trie data structure represented in FIG. 2. FIG. 2 illustrates the first preferred embodiment, in which three new fields, are added to each node of the trie data structure: these three are:

Full prefix flag field, which indicates if the output port address field contains information for a full prefix.

Subprefix output port address field, which contains the output port address associated with the subprefix.

Valid subprefix pattern field, which contains, if appropriate, a bit mask indicating the existence of various subprefix output port addresses.

The number of possible terminal substrings of a subprefix is always 2 less than the number of words in the terminal node. The reason for this result is that the set of possible terminal substrings is merely the sequential counting of binary numbers from '0' to the binary number that is one binary digit less than the binary number that is equal to dimension of the node. Accordingly, since the final terminal substring is, in a sense, missing one binary digit and the number of words in a node is equal to 2 raised to the power of the dimension of the node, the number of possible terminal substrings of a subprefix is 2 less than the dimension of the terminal node. For example, if the dimension of a terminal node is 4, then the number of words in the node is 16, and the possible terminal subprefixes are: '0', '1', '00', '01', '10', '11', '000', '001', '010', '011', '100', '101', '110', '111'. Since the number of possible subprefixes are 14, it is possible to distribute all of them among the 16 words of the node.

As was the case in the prior art, it is important to note that each subprefix of the destination address field of a presented data packet maps to a single output port address; the reverse, however, is not the case: one output port address may be mapped to by many subprefixes.

Figure 4:
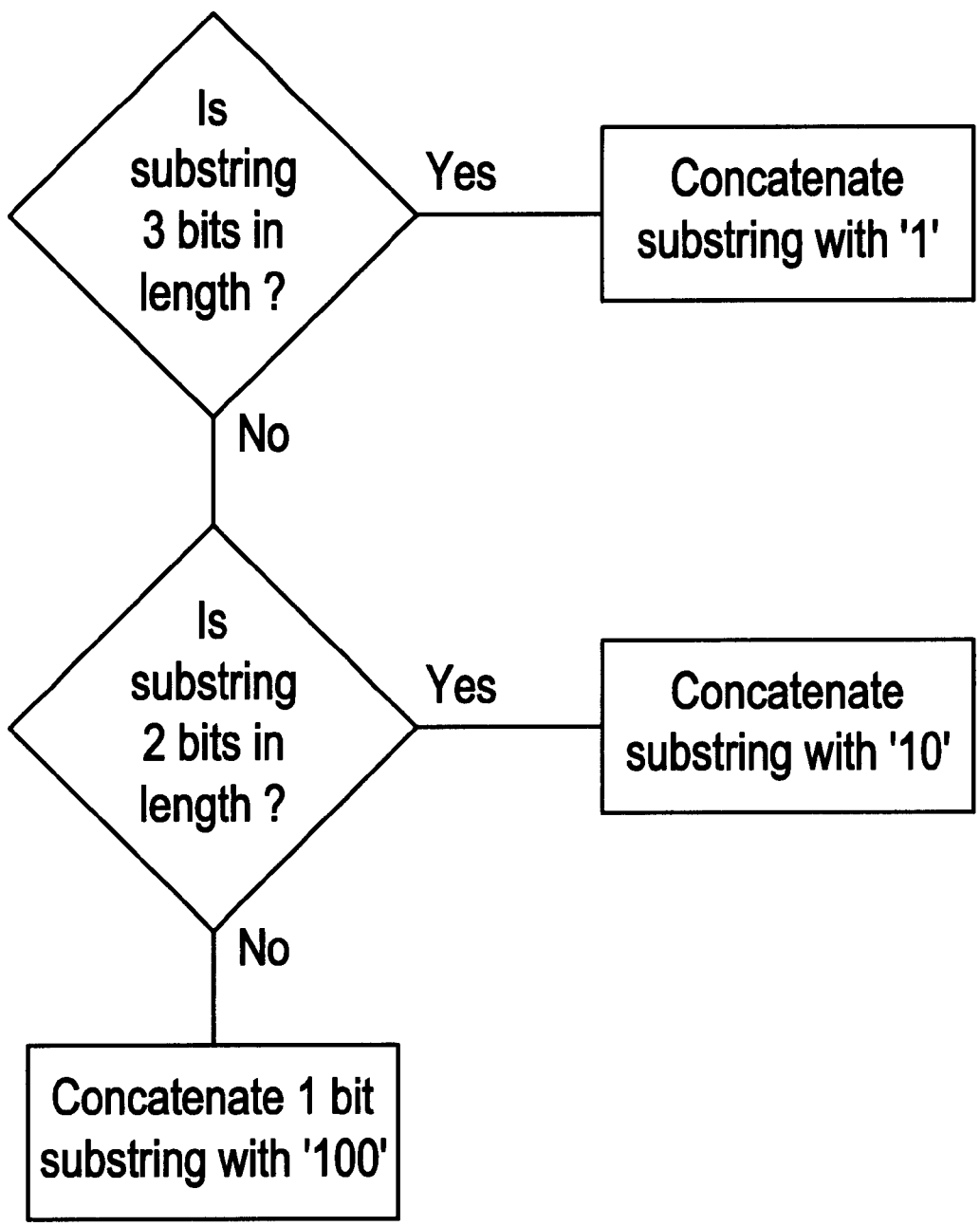
FIG. 4 is a flow chart illustrating an algorithm for storing certain information relating to the terminal substring of a subprefix.

In a first preferred embodiment of the present invention the output port address associated with a subprefix is stored at a specified location in a specified word of the terminal node. In the first preferred embodiment the distribution of subprefix output port addresses is determined by the following "distribution" algorithm that is shown in FIG. 4: any 3-bit substring is concatenated with '1', any 2-bit substring is concatenated with '10', any 1-bit substring is concatenated with '100.' In the first preferred embodiment of the invention, the field corresponding to children counter field is used for this purpose. This modification remedies the waste of memory, which resulted because only one children counter field of each node carried useful information. The binary numbers resulting from the concatenation algorithm constitutes the address of the word in the node where the output port address associated with the subprefix is to be found.

Retrieval using the trie data structure set forth in FIG. 2 uses the same steps as in the prior art. Insertion and deletion are implemented using different steps than these operations take in the prior art.

Figure 3:
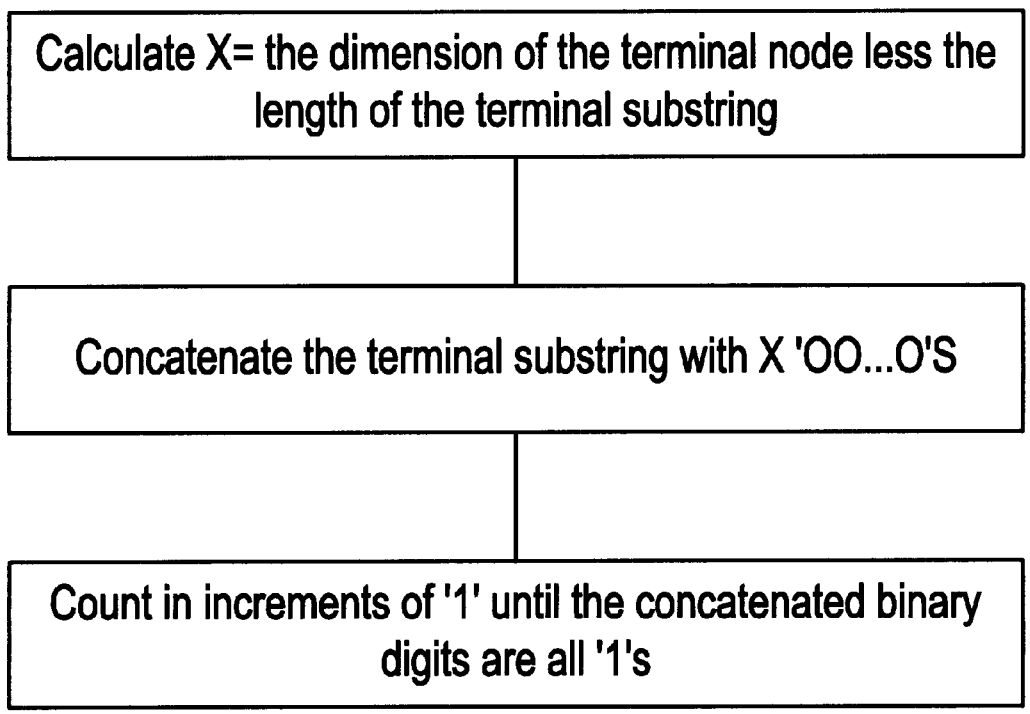
FIG. 3 is a flow chart illustrating a method of expanding a subprefix into prefixes.
Figure 6:
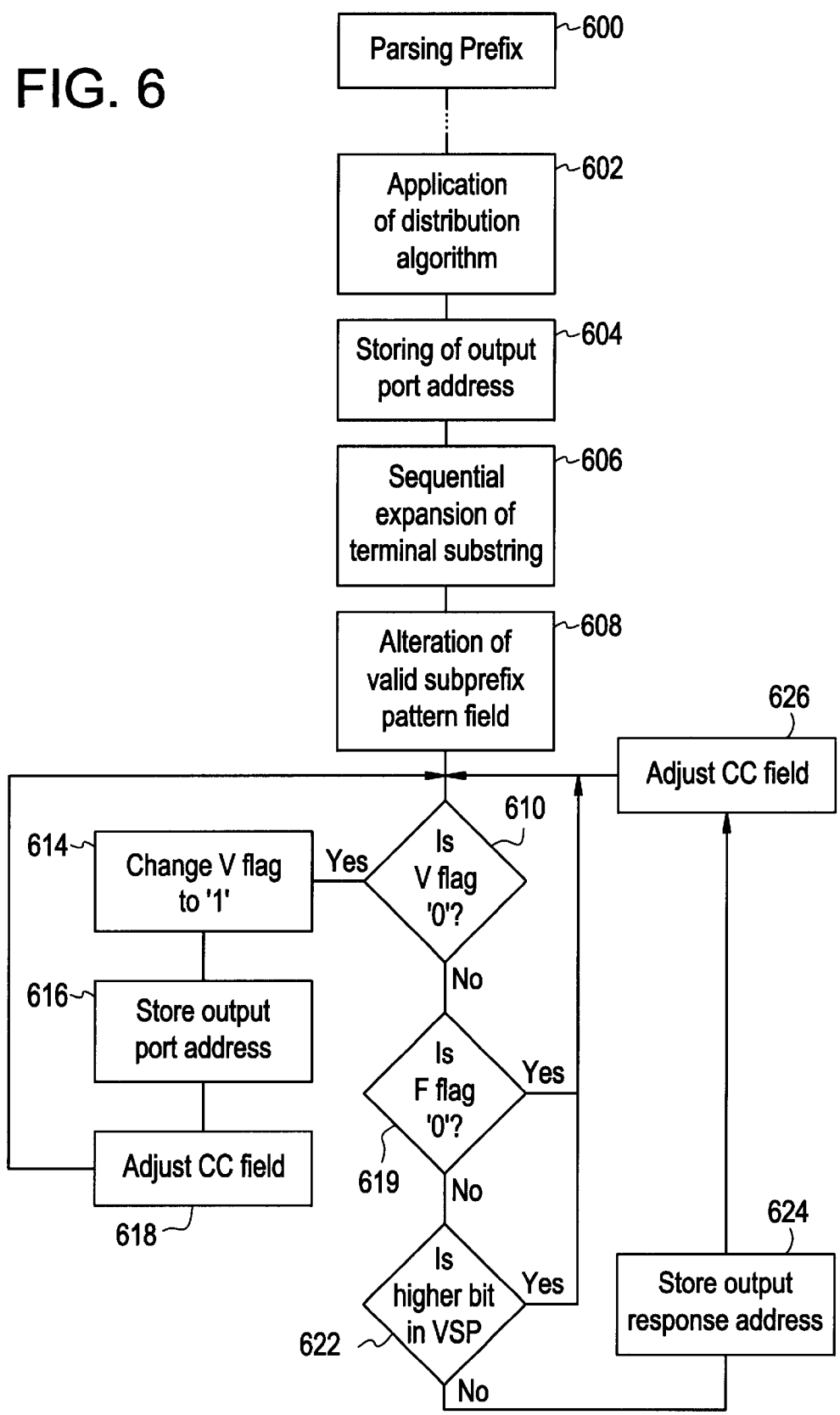
FIG. 6 is a flow chart illustrating insertion of prefixes into the trie data structure in accordance with a preferred embodiment of the present invention.

As shown in FIG. 6, in inserting a subprefix associated with an output port address the sequence of steps beginning with step (600) and ending immediately prior to the manipulation of the terminal node are the same as the prior art. With respect to the terminal node, the circuitry of the router first determines at step (602) the address of the word in which the associated output port address will be stored by applying the distribution algorithm. The circuitry of the router then stores at step (604) the associated output port address in that subprefix output port address field. The circuitry of the router at step (606) expands the terminal substring into all possible full substrings using the method shown in FIG. 3. For example if the terminal substring were '010' it would be expanded into '0100' and '0101'. (Expansion substrings are sequential. In terms of hardware they may be implemented simply by concatenating values of a counter to the substring being expanded.) At step (608) the circuitry of the router at every relevant address alters the valid subprefix pattern field. In the first preferred embodiment, the circuitry of the router performs the alteration by carrying out a bitwise Boolean OR operation where one operand is the existing valid subprefix pattern field and the other operand is a binary number whose bits are all '0' except for the one corresponding to the length of the subprefix. The circuitry of the router then processes each word of an expanded subprefix in turn.

With respect to each relevant word the valid flag field at step (610) is examined. If the valid flag field is '0', then the valid flag field is set to '1' at step (614) and the output port address associated with the inserted subprefix in the output port address field is stored at step (616). At step (618) the children counter field is incremented depending on the stop flag field of this word. If it was '0', then this word has already been taken into account and the circuitry of the router leaves the children counter field unchanged. If it is '1', then the corresponding word has not been taken into account, so in this case children counter field is incremented by 1.

Figure 5:
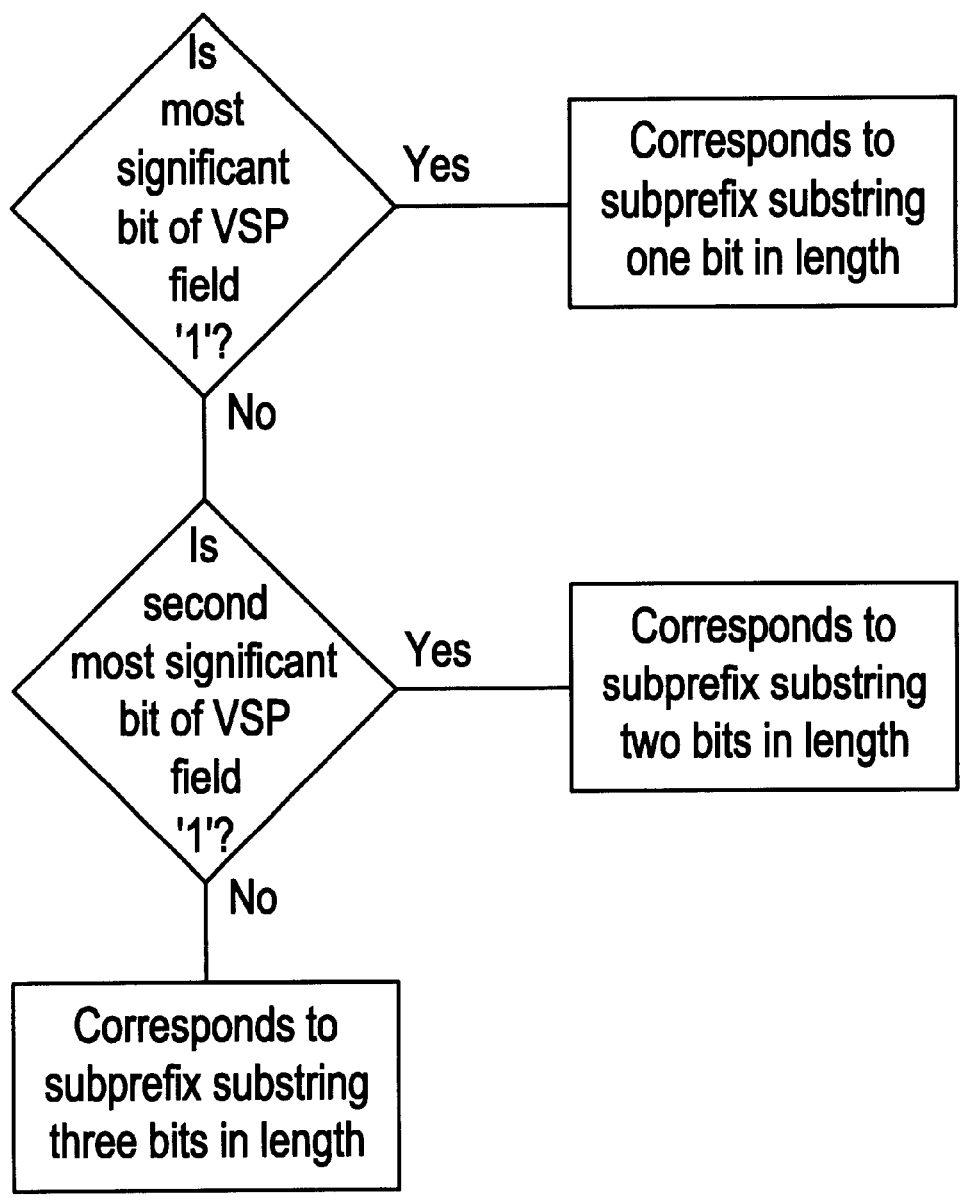
FIG. 5 is a flow chart illustrating the correspondence between the valid subprefix pattern field and subprefix substrings.

On the other hand, if at step (610) the valid flag field of the word being processed is '1', then the output port address field is updated at step (624) and the children counter field adjusted at step (626) only if the full prefix flag field is '0' at step (619) and no bits in the valid subprefix pattern field are asserted at step (622) that correspond (as determined in FIG. 5) to longer subprefixes. In other words, the subprefix is inserted only if an output port address of a shorter subprefix or prefix of the same length. An output port address associated with a full prefix or longer subprefixes will not be replaced.

The following example illustrates insertion in a trie data structure that is a first embodiment of the present invention. Assume routing address "r" associated with prefix "0110100011" is to be inserted into the trie data structure of FIG. 2. The actions of the circuitry of the router with respect to nodes $S_0$ and $S_1$ are identical to the prior art. Since the terminal substring '11' is a 2-bit substring, it will be concatenated with '10' in accordance with the distribution algorithm. The circuitry of the router stores subprefix output port address "r" at the subprefix output port address field at address '1 110' of node $S_2$. The circuitry of the router next adjusts the valid subprefix pattern field at addresses '1100', '1101', '1110', '1111' on a bit-by-bit basis using a Boolean OR operation. The circuitry of the router next processes the word at address '1100'. The circuitry of the router determines that the current value of the output port address field is for a one bit subprefix substring, therefore the circuitry of the router inserts output port address "r" in the output port address field. The circuitry of the router then move on to the word at address '1101' and inserts output port address "r" in the output port address field. The circuitry of the router then move on to the word at address '1110'. The circuitry of the router changes valid subprefix pattern field to '111'. The circuitry of the router determines that the full address field is '1' and the output port address is therefore not altered. At address '11111', the circuitry of the router alters the subprefix pattern field pattern to '111. The circuitry of the router determines that value of the output port address field is associated with 3-bit prefix and thus is not altered. The children counter field of node $S_2$ was not changed during this insertion since all the words encountered had valid bit flag field set to '1' prior to insertion.

As shown in FIG. 7, in deleting an output port address associated with a subprefix the sequence of steps beginning with step (700) and ending immediately prior to the manipulation of the terminal node are the same as the prior art. The circuitry of the router at step (702) first expands the terminal substring of the subprefix into all possible substrings. The circuitry of the router then processes each of the words addressed by the expansions. The circuitry of the router at step (704) adjusts the valid subprefix pattern field of each of these words. In the first preferred embodiment, the circuitry of the router performs the alteration by carrying out a bitwise Boolean AND operation where one operand is the existing valid subprefix pattern field and the other operand is a binary number whose bits are all '1' except for the one corresponding to the length of the subprefix. Next, at step (706) the circuitry of the router processes the full prefix flag field. If the full prefix flag field is '1,' the circuitry of the router processes the next word. If it is '0' however, the circuitry of the router processes valid subprefix pattern field at step (708). If any of the bits of the valid subprefix field, that correspond (as determined in FIG. 5) to the longer prefixes, are asserted, the circuitry of the router processes the next word. In the case at step (710) where no bits of valid subprefix pattern field are '1', the circuitry of the router invalidates the routing address field, by changing the valid bit field to '0' at step (711) and adjusts the children counter field of this word at step (712) if the stop bit field is not '0'.

On the other hand, if at least one bit of the valid subprefix pattern field is '1', then at step (714), the circuitry of the router determines the address of the longest subprefix output port address field and inserts the subprefix output port address into the output port address field.

The following example illustrates deletion with respect to the trie data structure of the first preferred embodiment of the present invention. Assume that the output port address associated with the subprefix '01101000111' is to be deleted from the trie data structure of FIG. 2. At node $S_2$ the circuitry of the router expands '111' to '1110' and '1111'. The circuitry of the router then processes the word at address '1110'. The circuitry of the router first alters its valid subprefix pattern field to '100'. The circuitry of the router then processes the valid bit flag field, which is '1' and full prefix flag field, which is '1'. Since the full prefix pattern field is '1', no alteration is made. The circuitry of the router then processes the next word at address '1111'. In the next word, the valid subprefix pattern field is also altered to '100' but the full prefix flag field is '0'. Therefore, the circuitry of the router replaces the output port address field at address '1111' by the value of the subprefix output port address at address '1110' of node $S_2$. The children counter field remains the same. Because children counter field is not '0', node $S_2$ is not deleted.

Although the present invention has been described in terms of various embodiments, it is not intended that the invention be limited to these embodiments. Modification within the spirit of the invention will be apparent to those skilled in the art. For example, the methods of the present invention could be adapted to label to flow mapping or to address filtering. One skilled in the art would appreciate that the methods of the present invention could also be adapted to multicasting in which the outport address field or the subprefix output port address field are actually points to a multicast pattern.

What is claimed:

1. A trie data structure stored on a computer readable medium that is used for storing a first binary number associated with a second binary number, said trie data structure consisting of nodes, said nodes including a root node, said root node being a first node, at least one intermediate level node, said intermediate level node being directly linked to said root node and having other lower level nodes directly linked to said intermediate level node, and at least one leaf node, said leaf node being directly linked to a higher level node and having no lower level nodes directly linked to said leaf node, each of said nodes being an associative table of binary numbers consisting of rows and columns with each number of said rows of each of said nodes being the same number, wherein, when the length of said second binary number is not an integral multiple of said number of rows, said first binary number is stored at a position defined by the intersection of a row and a column in one of said nodes, wherein said one node is determined by said second binary number and said row and column of said one node is determined by said second binary number.

2. A method for use in retrieving a first binary number associated with a second binary number in a trie data structure stored on a computer readable storage medium, said trie data structure consisting of nodes, said nodes including a root node, said root node being a first node, at least one intermediate level node, said intermediate level node being directly linked to said root node and having other lower level nodes directly linked to said intermediate level node, and at least one leaf node, said leaf node being directly linked to a higher level node and having no lower level nodes directly linked to said leaf node, each of said nodes being an associative table of binary numbers consisting of rows and columns with each number of said rows of each of said nodes being the same number, wherein, when the length of said second binary number is not an integral multiple of said number of rows, said first binary number is stored at a position defined by the intersection of at least one of said rows and at least one of said columns in at least one of said nodes, said method including the steps of:

i. parsing said second binary number into substrings, wherein each of said substrings has a number of binary digits equal to the dimension of each of said nodes except for the last substring whose number of binary digits is less than the dimension of each of said nodes;

ii. using said substrings to map a path from said root node to a terminal node holding said first binary number; and iii. retrieving said first binary number from said terminal node.

3. A method for use in inserting a first binary number associated with a second binary number in a trie data structure stored on a computer readable storage medium, said trie data structure consisting of nodes, said nodes including a root node, said root node being a first node, at least one intermediate level node, said intermediate level node being directly linked to said root node and having other lower level nodes directly linked to said intermediate level node, and at least one leaf node, said leaf node being directly linked to a higher level node and having no lower level nodes directly linked to said leaf node, each of said nodes being an associative table of binary numbers consisting of rows and columns with each number of said rows of each of said nodes being the same number, wherein, when the length of said second binary number is not an integral multiple of said number of rows, said first binary number is stored at a position defined by the intersection of at least one of said rows and at least one of said columns in a terminal node, said method including the steps of:

i. parsing said second binary number into substrings, wherein each of said substrings has a number of binary digits equal to the dimension of each of said nodes except for the last substring whose number of binary digits is less than the dimension of each of said nodes;

ii. using said substrings to map a path from said root node to said terminal node associated with said first binary number; and iii. storing said first binary number from said terminal node.

4. A method for use in deleting a first binary number associated with a second binary number in a trie data structure stored on a computer readable storage medium, said trie data structure consisting of nodes, said nodes including a root node, said root node being a first node, at least one intermediate level node, said intermediate level node being directly linked to said root node and having other lower level nodes directly linked to said intermediate level node, and at least one leaf node, said leaf node being directly linked to a higher level node and having no lower level nodes directly linked to said leaf node, each of said nodes being an associative table of binary numbers consisting of rows and columns with each number of said rows of each of said nodes being the same number, wherein, when the length of said second binary number is not an integral multiple of said number of rows, said first binary number is stored at a position defined by the intersection of a row and a column in a terminal node, said method including the steps of:

i. parsing said second binary number into substrings, wherein each of said substrings has a number of binary digits equal to the dimension of each of said nodes except for the last substring whose number of binary digits is less than the dimension of each of said nodes;

ii. using said substrings to map a path from said root node to said terminal node associated with said first binary number; and iii. deleting said first binary number from said terminal node.

5. In a trie data structure stored on a computer readable storage medium that is used for transmitting a presented data packet, said trie data structure including a root node, one or more intermediate level nodes, and one or more leaf nodes, wherein each node is composed of a number of words, each of said words having fields composed of a plurality of bits that is processed by the circuitry of a router and causes said router to transmit said presented data packet in accordance with an output port address associated with said word, a field composed of a plurality of bits that is examined by said circuitry and indicates to said circuitry if a valid output port address is contained in said word, a field composed of a plurality of bits that is capable of containing an output port address, a field composed of a plurality of bits that is capable of containing the address in said computer readable storage medium of another node of said trie data structure, a field composed of a plurality of bits that is capable of containing information indicating either the number of words in said node that contain useful information, wherein the improvement includes:

iv. a first field composed of a plurality of binary digits that is capable of containing information indicating either the number of words in said node that contain useful information or additional routing information associated with a subprefix;

v. a second field composed of a plurality of binary digits is capable of indicating that an output port address is associated with a full prefix; and vi. a third field composed of a plurality of binary digits that is capable of containing information indicating the location of valid output port addresses in said first field.

6. A method for use in retrieving the output port address of a presented data packet containing a destination address in which a trie data structure stored on a computer readable storage medium is used, said trie data structure including a root node, one or more intermediate level nodes, and one or more leaf nodes, wherein each node is composed of a number of words, each of said words having fields composed of a plurality of bits that is processed by the circuitry of a router and causes said router to transmit said presented data packet in accordance with an output port address associated with said word, a first field composed of a plurality of bits that is examined by said circuitry and indicates to said circuitry if a valid output port address is contained in said word, a second field composed of a plurality of bits that is capable of containing an output port address, a third field composed of a plurality of bits that is capable of containing the address in said computer readable storage medium of another node of said trie data structure, a fourth field composed of a plurality of bits that indicates whether said node is a terminal node, a fifth field composed of a plurality of binary digits that is capable of containing information indicating either the number of words in said node that contain useful information or additional routing information associated with a subprefix; a sixth field composed of a plurality of binary digits is capable of indicating that an output port address is associated with a full prefix; and a seventh field composed of a plurality of binary digits that is capable of containing information indicating the location of valid output port addresses in said first field, said method including the steps of:

i. parsing said destination address into a plurality of substrings, each containing a predetermined number of binary digits and each of said substrings having an equal number of binary digits;

ii. examining a word in said root node associated with the substring contained in said destination address that is composed of the most significant digits of said destination address;

iii. transmitting said data packet in accordance with the output port address contained in said output port address field of said word read in the preceding step if said first field of said word has a predetermined value and said second field of said word has a predetermined value, otherwise storing the output port address contained in said word and reading from said fifth field of said word the address of a nonroot node of said trie data structure;

iv. examining a word in said node indicated in the preceding step associated with the substring contained in said destination address that is composed of the next most significant digits of said destination address;

v. transmitting said data packet in accordance with the output port address contained in said output port address field of said word read in the preceding step if first field has a predetermined value and said second field of said word has a predetermined value, otherwise storing the output port address contained in said word and reading the address from said fifth field of said word of another node of said trie data structure;

vi. iteratively repeating steps iii through v until an output port address is returned or the retrieval terminates.

7. A method for use in inserting information associated with a subprefix regarding the output port address of a data packet containing a destination address, in which a trie data structure stored on a computer readable storage medium is used, said trie data structure including a root node, one or more intermediate level nodes, and one or more leaf nodes, wherein each node is composed of a number of words, each of said words having fields composed of a plurality of bits that is processed by the circuitry of a router and causes said router to transmit said presented data packet in accordance with an output port address associated with said word, a first field composed of a plurality of bits that is examined by said circuitry and indicates to said circuitry if a valid output port address is contained in said word, a second field composed of a plurality of bits that is capable of containing an output port address, a third field composed of a plurality of bits that is capable of containing the address in said computer readable storage medium of another node of said trie data structure, a fourth field composed of a plurality of bits that indicates whether said node is a terminal node, a fifth field composed of a plurality of binary digits that is capable of containing information indicating either the number of words in said node that contain useful information or routing information associated with a subprefix; a sixth field composed of a plurality of binary digits is capable of indicating that an output port address is associated with a full prefix; and a seventh field composed of a plurality of binary digits that is capable of containing information indicating the location of valid output port addresses in said first field, said method including the steps of:

i parsing said subprefix into a plurality of substrings, wherein each of said substring has number of binary digits equal to the dimension of each of said nodes except for a last substring whose number of binary digits is less than the dimension of each of said nodes;

ii. examining a first word in said root node associated with the most significant digits of said subprefix;

iii. reading from said third field of said first word the address of a nonroot node of said trie data structure;

iv. examining a second word in said node indicated in the preceding step associated with the substring that is composed of the next most significant digits of said subprefix;

v. reading the address from said third field of said second word of another node of said trie data structure;

vi. iteratively repeating steps iv through v until the entire subprefix is read and then proceeding to step vii;

vii. storing said output port address in said field fifth field;

viii. sequentially expanding said last substring;

ix. altering said seventh field to a predetermined value;

x. if said first field is a predetermined value then performing the following steps:
 altering said first field to a predetermined value
 storing said output port address;

xi. adjusting said fifth field to a predetermined value;

xii. if said sixth field is a predetermined value then proceeding to step x;

xiii. if said seventh field is a predetermined value then proceeding to step x, otherwise proceeding to step xiv;

xiv. storing said output port address in said fifth field;

xv. adjusting said fifth field to predetermined value; and xvi. iteratively repeating steps ix through xv with respect to each of said sequential expansions of said last substring.

8. A method for use in deleting information associated with a subprefix regarding the output port address of a data packet containing a destination address in which a trie data structure stored on a computer readable storage medium is used, said trie data structure including a root node, one or more intermediate level nodes, and one or more leaf nodes, wherein each node is composed of a number of words, each of said words having fields composed of a plurality of bits that is processed by the circuitry of a router and causes said router to transmit said presented data packet in accordance with an output port address associated with said word, a first field composed of a plurality of bits that is examined by said circuitry and indicates to said circuitry if a valid output port address is contained in said word, a second field composed of a plurality of bits that is capable of containing an output port address, a third field composed of a plurality of bits that is capable of containing the address in said computer readable storage medium of another node of said trie data structure, a fourth field composed of a plurality of bits that indicates whether said node is a terminal node, a fifth field composed of a plurality of binary digits that is capable of containing information indicating either the number of words in said node that contain useful information or additional routing information associated with a subprefix; a sixth field composed of a plurality of binary digits is capable of indicating that an output port address is associated with a full prefix; and a seventh field composed of a plurality of binary digits that is capable of containing information indicating the location of valid output port addresses in said first field, said method including the steps of:

i. parsing said subprefix into a plurality of substrings, wherein each of said substrings has a number of binary digits equal to the dimension of each of said nodes except for a last substring whose number of binary digits is less than the dimension of each of said nodes;

ii. examining a first word in said root node associated with the most significant digits of said subprefix;

iii. reading from said fifth field of said first word the address of a nonroot node of said trie data structure;

iv. examining a second word in said node indicated in the preceding step associated with the substring contained in said destination address that is composed of the next most significant digits of said destination address;

v. reading the address from said fifth field of said second word of another node of said trie data structure;

vi. iteratively repeating steps iii through v until the entire subprefix is read, and then proceeding to step xviii;

vii. sequentially expanding said last substring to all possible full substrings;

viii. adjusting said seventh field of each of said full substrings to a predetermined value;

ix. if said sixth field of said full substring is a predetermined value then proceeding to step vii;

x. if said seventh field of said full substring is a predetermined value then proceeding to step vii;

xi. if any of said bits of said seventh field of said full substring is a predetermined value then proceeding to step xii;

xii. setting said first field of said full substring to a predetermined value;

xiii. adjusting said fifth field of said full substring to predetermined value;

xiv. iteratively repeating steps ix through xv with respect to each of said sequential expansions of said last substring until each of said full substrings have been processed.

* * * * *